United States Patent
Fu et al.

(10) Patent No.: US 12,471,139 B2
(45) Date of Patent: Nov. 11, 2025

(54) RESOURCE TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 375 days.

(21) Appl. No.: 18/194,335

(22) Filed: Mar. 31, 2023

(65) Prior Publication Data
US 2023/0239923 A1 Jul. 27, 2023

Related U.S. Application Data

(63) Continuation of application No. PCT/CN2020/133444, filed on Dec. 2, 2020.

(51) Int. Cl.
*H04W 74/0808* (2024.01)
*H04W 16/14* (2009.01)
*H04W 72/563* (2023.01)

(52) U.S. Cl.
CPC ....... *H04W 74/0808* (2013.01); *H04W 16/14* (2013.01); *H04W 72/563* (2023.01)

(58) Field of Classification Search
CPC .......... H04W 74/0808; H04W 16/14; H04W 72/563
See application file for complete search history.

(56) References Cited

U.S. PATENT DOCUMENTS

2016/0192396 A1 6/2016 Ng

FOREIGN PATENT DOCUMENTS

| CN | 105592468 | * | 5/2016 | ........ H04W 74/0808 |
| CN | 105592468 A | | 5/2016 | |

(Continued)

OTHER PUBLICATIONS

3GPP TSG RAN WG1 Meeting #88bis R1-1704838, Spokane, USA Apr. 3-7, 2017, Agenda Item: 7.2.2.2, Source: LG Electronics, Title: Discussion on multiple starting and ending positions for LAA UL, Document for: Discussion and decision, all pages.

(Continued)

*Primary Examiner* — Myron Wyche
(74) *Attorney, Agent, or Firm* — Ladas & Parry, LLP

(57) ABSTRACT

Provided are a resource transmission method, a terminal device, and a network device, which are applied to the technical field of communications and can reduce or prevent transmission interference and waste of transmission resources. The embodiment of the present invention involves: according to first information, determining not to perform listen before talk (LBT) detection and/or resource transmission, or determining to perform LBT detection and/or resource transmission for a first resource, wherein the first information is used for indicating at least one of the following: a second resource, performing LBT detection and/or resource transmission, and not performing LBT detection and/or resource transmission.

26 Claims, 4 Drawing Sheets

(56) References Cited

FOREIGN PATENT DOCUMENTS

CN         109496400 A     3/2019
WO        2017070953 A1    5/2017

OTHER PUBLICATIONS

International Search Report in the international application No. PCT/CN2020/133444, mailed on Sep. 1, 2021.
Written Opinion of the International Search Authority in the international application No. PCT/CN2020/133444, mailed on Sep. 1, 2021.
3GPP TSG RAN Meeting #82 RP-182878 (revision of RP-182806), Sorrento, Italy, Dec. 10-13, 2018, Source: Qualcomm Inc., Title: New WID on NR-based Access to Unlicensed Spectrum, Document for: Approval, Agenda Item: 9.1.1, all pages.
3GPP TS 38.321 V16.2.1 (Sep. 2020), 3rd Generation Partnership Project; Technical Specification Group Radio Access Network; NR; Medium Access Control (MAC) protocol specification, (Release 16), all pages.

\* cited by examiner

RESOURCE TRANSMISSION METHOD, TERMINAL DEVICE, AND NETWORK DEVICE

CROSS REFERENCE TO RELATED APPLICATION

This is a continuation of International Application No. PCT/CN2020/133444 filed on Dec. 2, 2020, and entitled "RESOURCE TRANSMISSION METHOD, TERMINAL DEVICE, AND NETWORK DEVICE", the disclosure of which is incorporated herein by reference in its entirety.

TECHNICAL FIELD

The disclosure relates to the technical field of communication, and in particular to a method for resource transmission, a terminal device and a network device.

BACKGROUND

When a network device configures resources for terminal devices, resources for a plurality of User Equipments (UEs) may be configured at conflicting locations. In this case, the plurality of UEs may perform listen-before-talk (LBT) detection at the same location, and may all consider that there is no resource conflict, and then the plurality of UEs perform resource transmission, thus causing transmission interference and waste of transmission resources.

DETAILED DESCRIPTION

Figure 1:
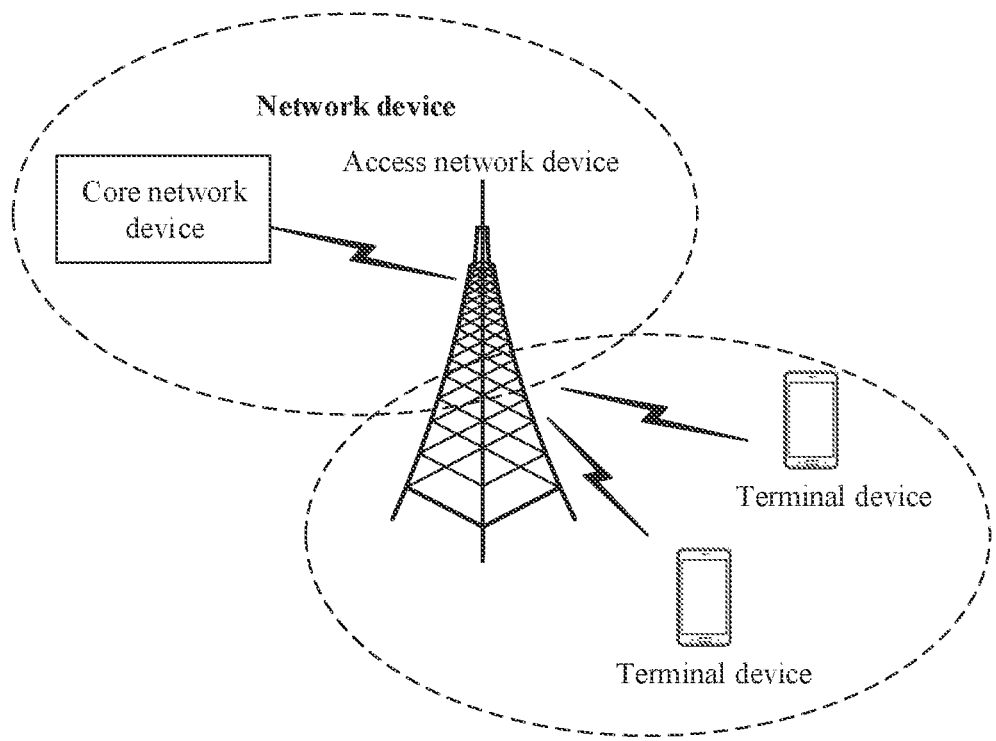
FIG. 1 is a schematic diagram of architecture of a communication system according to an embodiment of the present disclosure.

The technical solutions in the embodiments of the disclosure will be described below in combination with the drawings in the embodiments of the disclosure. It is apparent that the described embodiments are only part of the embodiments of the disclosure, not all the embodiments. Based on the embodiments in the disclosure, all other embodiments obtained by those of skilled in the art without creative work shall fall within the protection scope of the disclosure.

A brief description of the related art and some terms involved in the embodiments of the present disclosure will be described as follows:

1. Background of Ultra-reliable and Low Latency Communications (URLLC)

In 5G Radio Access Network (RAN) 2 URLLC, it is required to support the transmission of services such as Factory Automation, Transport Industry, Intelligent Power Distribution and other services in 5G system. In order to support the transmission of URLLC services, Configured Grant (CG) is enhanced, that is, multiple CG configurations are introduced, and the specific configuration and use of the CG (such as support for a slot-level period, support for automatic transmission of the CG, etc.) are enhanced.

R17 needs to consider supporting the URLLC service in a New Radio (communication system) Unlicensed (NRU) scenario with controlled interference.

(1) The use of NRU CG and ULRRC CG enhancements (harmonizing UL configured-grant enhancements in NRU and URLLC introduced in Rel-16 to be applicable for unlicensed spectrum) in the NRU scenario may be considered.

(2) An UE-initial Channel Occupancy Time (COT) for FBE may be considered, where the FBE is a frame based equipment.

LBT defines two types of devices, one is FBE and the other is Load Based Equipment (LBE). For FBE, a period is set, and channel detection is performed at a fixed location in each period, for example, Clear Channel Assessment (CCA) detection is performed within each CCA detection time. If it is detected that a channel state is idle, the channel can be occupied for transmission; if it is detected that the channel state is non-idle, the channel cannot be occupied by the device in this period until the detection is continued at a fixed location in the next period.

2. Enhancement of CG in URLLC

In order to support the high latency requirement of the URLLC service, the URLLC enhances a CG period and supports service periods with any slot-level.

In order to support a variety of URLLC services and the high latency requirements of URLLC services, the URLLC introduces multiple CGs. Different CG configurations have different Hybrid Automatic Repeat Request (HARQ) processes, and a HARQ process identifier offset 2 (HARQ-ProcID-Offset2) is used to ensure that different CG processes are different.

Due to the conflict between CG resources and other resources, automatic transmission for CG is introduced in order to ensure that the Media Access Control Protocol Data Unit (MAC PDU) which has been packaged in CG resources will not be discarded, or transmitted as soon as possible. For the CG with the packaged MAC PDU that cannot be transmitted due to resource conflict, subsequent CG resources in the same CG configuration and in the same HARQ process can be used for new transmission. The use of automatic transmission is determined through the automatic transmission mechanism (autonomousTx).

If the physical layer has different priorities: there is a conflict between CGs, MAC may indicate one or more MAC PDUs to the physical layer. Similarly, if there is a conflict between data and an uplink Scheduling Request (SR), the MAC can further indicate the SR and the MAC PDU(s) to the physical layer.

3. NRU Related Background

NR may operate on unlicensed frequency bands in the following operating scenarios:

Scenario A is a carrier aggregation scenario, in which a Primary Cell (PCell) operates on a licensed spectrum, and Secondary Cells (SCells) operating on unlicensed spectrums are aggregated through carrier aggregation. Scenario B is a dual-connection operating scenario, in which PCell is a Long Term Evolution (LTE) licensed spectrum and PScell is an NR unlicensed spectrum. Scenario C is an independent operating scenario, in which NR operates as an independent cell on the unlicensed spectrum. Scenario D is an NR single cell scenario, in which Uplink (UL) is operated on a licensed spectrum and Downlink (DL) is operated on an unlicensed spectrum. Scenario E is a dual-connection operating scenario, in which PCell operates on an NR licensed spectrum and PScell operates on an NR unlicensed spectrum.

Generally, the operating band of NRU is the 5 GHz unlicensed spectrum and the 6 GHz unlicensed spectrum. On the unlicensed spectrums, NRU should be designed to ensure fairness with other systems already operating on these unlicensed spectrums, such as Wireless Fidelity (WiFi). The principle of fairness is that the impact of NRU on systems (such as WiFi) already deployed on the unlicensed spectrum cannot exceed the impact between these systems.

In order to ensure fair coexistence among systems in the unlicensed spectrums, energy detection has been agreed as a basic coexistence category. A general energy detection category is the LBT category. The basic principle of this category is that before the base station or terminal (transmitting end) transmits data on an unlicensed spectrum, it needs to listen for a period of time according to a rule. If the listening result indicates that the channel is idle, the transmitting end can transmit data to the receiving end. If the listening result indicates that the channel is occupied, the transmitting end needs to back off for a period of time according to the rule and then continue to listen to the channel, and cannot transmit data to the receiving end until the listening result indicates that the channel is idle.

At present, there are four channel access categories in NRU, referring to TR 38.889:

Category 1: Direct Transport Category

This category can be used for a TX side to start transmission quickly after a switching gap in a channel occupancy time (COT).

The switching gap is the transition time from reception to transmission, and is typically not greater than 16 us.

Category 2: LBT Category Without Need of Random Back-Off

This category means that the time for UE to listen to the channel is fixed and is generally short, such as 25 us;

Category 3: LBT Category With Random Back-Off (The Contention Window is Fixed)

In the LBT process, the transmitting side randomly selects a random value in the contention window to determine the time for listening to the channel;

Category 4: LBT Category With Random Back-Off (The Contention Window is not Fixed)

In an LBT process, the transmitting side randomly selects a random value in the contention window to determine the time for listening to the channel, and the contention window is variable.

To sum up, for the terminal device, the data transmission from the base station to the terminal device needs to be within the Maximum Channel Occupancy Time (MCOT). If the base station does not preempt the channel, that is, the data transmission is outside the MCOT time, the terminal device will not receive the scheduling data from the base station to the terminal device.

4. Uplink LBT Failure in NRU

Uplink transmission initiated by UE mainly includes the following:

SR: used to request for uplink resources;

Physical Random Access Channel (PRACH) transmission: UE needs to send msg1 since Random Access Channel (RACH) is triggered;

Physical Uplink Shared Channel (PUSCH) transmission: which includes uplink data transmission based on CG and uplink data transmission based on Dynamic Grant (DG);

physical layer signaling transmission: which includes Acknowledge (ACK)/Not Acknowledge (NACK) feedback, Channel Status Indicator (CSI) reporting, etc.

On the unlicensed spectrum, the UE needs to use LBT to listen to whether the channel is available before transmitting the SR, PRACH or PUSCH. If the channel is not available, that is, the LBT fails, the UE needs to wait until the next transmission opportunity to perform the LBT again. If LBT failure is detected, information of the LBT failure needs to be notified to the MAC layer.

In R16, it is assumed that only one resource to be transmitted will be indicated by the MAC layer to the physical layer.

During network configuration, resources for multiple UEs may be configured in conflicting locations. Specifically, for the UE-initial LBT detection for FBE, if all UEs perform detection at the same location, it will cause interference or waste of resources, so enhancement is needed to minimize or avoid this problem.

In order to solve the above problems, the embodiments of the disclosure provide a method for resource transmission, the terminal device can determine, according to first information, not to perform at least one of LBT detection or resource transmission, or to perform at least one of the LBT detection or the resource transmission for a first resource. The first information indicates at least one of: a second resource; performing at least one of the LBT detection or the resource transmission; or not performing at least one of the LBT detection or the resource transmission. As such, a method for performing LBT detection and/or resource transmission is provided during resource transmission, so that LBT detection conflicts and resource transmission conflicts can be avoided or reduced as much as possible, and transmission interference and waste of transmission resources can be avoided.

The embodiments of the disclosure further provide a method for resource transmission. The terminal device can perform LBT detection according to second information. The second information indicates at least one of: a resource location, an FFP, a starting point of the FFP, an LBT period of FBE, or an LBT starting time of the FBE. As such, a method of avoiding LBT detection time with information such as the resource location, the FFP, the starting point of the FFP, the LBT period of the FBE, and the LBT starting time of the FBE is provided during resource transmission, so that LBT detection conflicts can be avoided or reduced as much as possible, and transmission interference and waste of transmission resources can be avoided.

FIG. 1 is a schematic diagram of architecture of a communication system applied to the embodiments of the present disclosure. The communication system may include a network device which may be a device that communicates with a terminal device (or a communication terminal a terminal). A network device may provide communication coverage for a specific geographical area and may communicate with a terminal device located within the coverage area. FIG. 1 exemplarily illustrates one network device and two terminal devices. Alternatively, the communication system may include a plurality of network devices and other numbers of terminal devices may be included within the coverage of each network device, which is not limited by embodiments of the present disclosure. Alternatively, the communication system may further include other network entities such as a network controller, a mobility management entity, etc. The embodiments of the present disclosure are not limited thereto.

In the embodiments of the disclosure, various embodiments are described with reference to a network device and a terminal device. The terminal device may also be referred to as UE, an access terminal, a user unit, a user station, a mobile station, a mobile radio station, a remote station, a remote terminal, a mobile device, a user terminal, a terminal, a wireless communication device, a user agent, a user apparatus, or the like.

The terminal device may be a Station (ST) in the WLAN, may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an on-board device, a wearable device, a terminal device in the next generation communication system, such as NR network, a terminal device in a Public Land Mobile Network (PLMN) in future evolution, or the like.

In the embodiments of the disclosure, the terminal device may be deployed on land, including indoor or outdoor, hand-held, wearable or on-board, may also be deployed on water (for example, a ship), and may also be deployed in air (for example, on an aircraft, a balloon, and a satellite).

In the embodiments of the disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city (smart city), a wireless terminal device in a smart home, and the like.

As an example rather than a limitation, in the embodiments of the disclosure, the terminal device may also be a wearable device. The wearable device, also referred to as a wearable intelligent device, is a generic term of wearable devices obtained by performing intelligent designing and development on daily wearing products, such as glasses, gloves, watches, clothes, and shoes, by applying a wearable technology. The wearable device is a portable device that is directly put on a human body or is integrated with clothes or ornaments of a user. The wearable device is not merely a hardware device, but further implements a powerful function through software support, data exchange, and cloud-based interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

The network device may further include access network device and core network device. That is, the wireless communication system further includes a plurality of core networks for communicating with access network devices. The access network device may be an Evolutionary Node B (eNB or e-NodeB) macro base station, a micro base station (also referred to as a "small base station"), a pico base station, an access point (AP), a transmission point (TP) or a new generation Node B (gNodeB) in an LTE system, a Next Radio (NR) system (mobile communication system) or an Authorized Auxiliary Access (LAA)-LTE system.

In the embodiments of the disclosure, the network device may be a device for communicating with a mobile device. The network device may be an Access Point (AP) in WLAN, a Base Transceiver Station (BTS) in GSM or CDMA, or may be a NodeB (NB) in WCDMA, or may be an Evolutional Node B (eNB or eNodeB) in LTE, or a relay station or an access point, or an on-board device, a wearable device, or a network device or a gNB in an NR network, or a network device in a PLMN network in future evolution, or a network device in an NTN network, or the like.

As an example rather than a limitation, in the embodiments of the disclosure, the network device may have mobility, for example, the network device may be a mobile device. Optionally, the network device may be a satellite or a balloon station. For example, the satellite may be a Low Earth Orbit (LEO) satellite, a Medium Earth Orbit (MEO) satellite, a Geosynchronous Earth Orbit (GEO) satellite, a High Elliptical Orbit (HEO) satellite, and the like. Optionally, the network device may also be a base station arranged on at the positions, such as land and water.

In the embodiments of the disclosure, the network device may provide a service for a cell, and the terminal device communicates with the network device through a transmission resource (for example, a frequency-domain resource or a spectrum resource) used by the cell. The cell may be a cell corresponding to the network device (for example, a base station). The cell may belong to a macro base station, or belong to a base station corresponding to a small cell. Here, the small cell may include: a metro cell, a micro cell, a pico cell, a femto cell, and the like. These small cells have the characteristics of small coverage and low transmitting power, and are suitable for providing high-rate data transmission services.

It should be understood that a device having a communication function in a network/system in the embodiments of the present disclosure may be referred to as a communication device. As an example of the communication system illustrated in FIG. 1, the communication device may include a network device and a terminal device having a communication function. The network device and the terminal device may be specific devices in the embodiments of the present disclosure, and details are not described herein. The communication device may further include other devices in the communication system, such as network controllers, mobility management entities, and other network entities, which are not limited in the embodiments of the present disclosure.

The technical solution of the embodiments of the disclosure can be applied to various communication systems, For example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to Unlicensed spectrum (LTE-U) system, NR-based access to Unlicensed spectrum (NR-U) system, Non-Terrestrial Network (NTN) System, Universal Mobile Telecommunication System (UMTS), Wireless Local Area Network (WLAN), Wireless Fidelity (WiFi), 5th-Generation (5G) system or other communication systems.

Generally, conventional communication systems support a limited number of connections, However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present disclosure may also be applied to these communication systems.

The communication system in the embodiments of the disclosure may be applied to Carrier Aggregation (CA) scene, Dual Connectivity (DC) scene, and Standalone (SA) network distribution scene.

Figure 2:
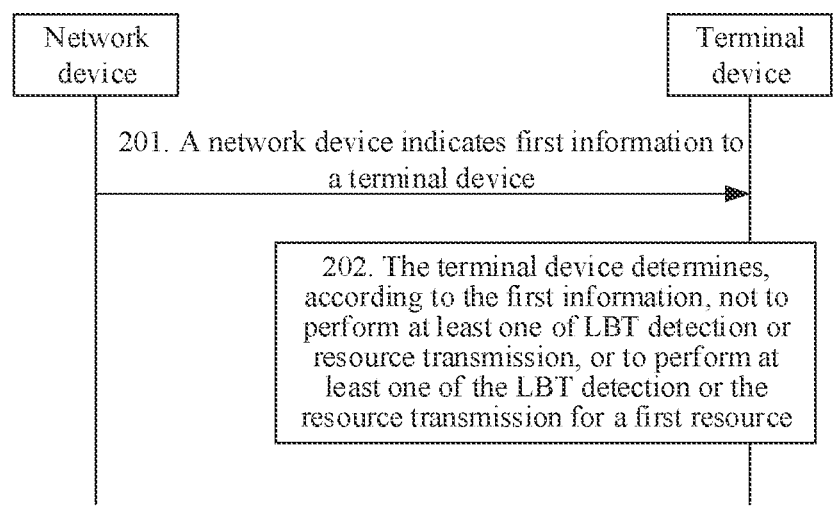
FIG. 2 is a first schematic diagram of a method for resource transmission according to an embodiment of the present disclosure.

As shown in FIG. 2, the embodiment of the disclosure provides a method for resource transmission, which includes operations as follows.

At operation 201, a network device indicates first information to a terminal device.

The first information is indicated by the network device, or the first information is predefined by the protocol.

The first information indicates at least one of:

a second resource; performing at least one of the LBT detection or the resource transmission; or not performing at least one of the LBT detection or the resource transmission.

Optionally, the second resource may be indicated with a resource identifier, a resource index, or the like.

Optionally, the second resource may further be implicitly indicated, i.e. by default.

Optionally, the second resource may include one of: all resources, a part of resources, a specified resource, a specific resource, or a resource for a specific object.

Optionally, the resource for the specific object includes at least one of: a resource for a specific logical channel, a resource for a specific service, a resource for a specific priority, a resource for a specific identifier, a resource for a specific terminal device, or a resource for a specific type.

Optionally, the resource for the specific priority include at least one of:

(1a) a resource for a specific resource priority; for example, a high priority resource;

(1b) a resource for a specific-priority service; for example, a resource corresponding to a high-priority service; or (1c) a resource corresponding to a specific-priority service when the specific-priority service exists, or a resource corresponding to a logical channel when the logical channel has data to be transmitted.

For example, the resource for the specific priority is a resource corresponding to the high priority service when there is a high priority service to be transmitted.

Optionally, the specific terminal device includes at least one of:

a terminal device with a specific priority, for example, a terminal device with a high priority;

a terminal device in a specific group; for example, a terminal device belonging to a certain group;

a terminal device with a specific identifier; for example, a terminal device with an identifier of X; or a terminal device with a specific capability, for example, a UE that supports a specific priority processing mode, a UE that supports performing LBT detection and/or resource transmission based on priority, and a legacy UE.

Optionally, the resource for the specific type include at least one of: a PRACH resource, a DG resource, a CG resource, a PUSCH resource, or a Physical Uplink Control Channel (PUCCH) resource.

Optionally, the performing at least one of the LBT detection or the resource transmission; or not performing at least one of the LBT detection or the resource transmission may be indicated by indication information, by an indication field, or by an implicit indication (i.e. performing at least one of the LBT detection or the resource transmission by default, or not performing at least one of the LBT detection or the resource transmission by default).

Exemplarily, there are the following possible cases.

In a first case, there is an indication for performing at least one of the LBT detection or the resource transmission, which indicates performing at least one of the LBT detection or the resource transmission.

In a second case, there is an indication field for performing at least one of the LBT detection or the resource transmission, and the value of the indication field is true, which indicates performing at least one of the LBT detection or the resource transmission.

In a third case, there is an indication field for not performing at least one of the LBT detection or the resource transmission, and the value of the indication field is false, which indicates performing at least one of the LBT detection or the resource transmission.

In a fourth case, there is no indication for performing at least one of the LBT detection or the resource transmission, and there is no indication for not performing at least one of the LBT detection or the resource transmission, at least one of the LBT detection or the resource transmission is performed by default.

In a fifth case, there is an indication for not performing at least one of the LBT detection or the resource transmission, which indicates not performing at least one of the LBT detection or the resource transmission.

In a sixth case, there is an indication field for not performing at least one of the LBT detection or the resource transmission, and the value of the indication field is true, which indicates not performing at least one of the LBT detection or the resource transmission.

In a seventh case, there is an indication field for not performing at least one of the LBT detection or the resource transmission, and the value of the indication field is false, which indicates performing at least one of the LBT detection or the resource transmission.

In an eighth case, there is no indication for performing at least one of the LBT detection or the resource transmission, and there is no indication for not performing at least one of the LBT detection or the resource transmission, at least one of the LBT detection or the resource transmission is not performed by default.

It should be understood that other cases may exist to indicate performing at least one of the LBT detection or the resource transmission, or not performing at least one of the LBT detection or the resource transmission, which are not listed herein.

Exemplarily, the first information may specifically have the following alternative forms.

A first form: the second resource.

Optionally, in the case that at least one of the LBT detection or the resource transmission is performed by default, the first information in the first form indicates performing at least one of the LBT detection or the resource transmission for the second resource.

Optionally, in the case that at least one of the LBT detection or the resource transmission is not performed by default, the first information in the first form indicates not performing at least one of the LBT detection or the resource transmission for the second resource.

Optionally, in the case that at least one of the LBT detection or the resource transmission is not performed by default, the first information in the first form may indicate performing at least one of the LBT detection or the resource transmission for resources other than the second resource.

A second form: performing at least one of the LBT detection or the resource transmission.

Optionally, performing at least one of the LBT detection or the resource transmission for the default second resource may be indicated.

Optionally, at least one of the LBT detection or the resource transmission may be performed directly for the second resource.

A third form: not performing at least one of the LBT detection or the resource transmission.

Optionally, not performing at least one of the LBT detection or the resource transmission for the default second resource may be indicated.

Optionally, performing at least one of the LBT detection or the resource transmission for resources other than the default second resource may be indicated.

Optionally, at least one of the LBT detection or the resource transmission may not be performed directly for the second resource.

Optionally, not performing at least one of the LBT detection or the resource transmission on all resources may be indicated.

A fourth form: the second resource, and performing at least one of the LBT detection or the resource transmission.

Optionally, performing at least one of the LBT detection or the resource transmission for the second resource may be indicated.

A fifth form: the second resource, and not performing at least one of the LBT detection or the resource transmission.

Optionally, not performing at least one of the LBT detection or the resource transmission for the second resource may be indicated.

Optionally, performing at least one of the LBT detection or the resource transmission for resources other than the second resource may be indicated.

It should be understood that the first information may also exist in other possible forms and will not be listed here.

At operation 202, the terminal device determines, according to the first information, not to perform at least one of LBT detection or resource transmission, or to perform at least one of the LBT detection or the resource transmission for a first resource.

In the embodiment of the disclosure, the COT can be obtained by performing LBT detection.

Optionally, the terminal device operates on an unlicensed spectrum, or the terminal device operates on a licensed spectrum.

Optionally, the first resource and the second resource may be the same.

Optionally, the first resource may be different from the second resource.

Optionally, in the case that the first resource is different from the second resource, the first resource may be determined according to the second resource.

For example, the first resource may be a resource other than the second resource, or the first resource may be a resource associated with the second resource.

The embodiments of the disclosure provides a method for resource transmission, the terminal device can determine, according to first information, not to perform at least one of LBT detection or resource transmission, or to perform at least one of the LBT detection or the resource transmission for a first resource. The first information indicates at least one of: a second resource; performing at least one of the LBT detection or the resource transmission; or not performing at least one of the LBT detection or the resource transmission. As such, a method for performing LBT detection and/or resource transmission is provided during resource transmission, so that LBT detection conflicts and resource transmission conflicts can be avoided or reduced as much as possible, and transmission interference and waste of transmission resources can be reduced or avoided.

Optionally, in the embodiments of the present disclosure, the terminal device may determine whether the resource conflict exists, and in response to existence of a resource conflict, determine, according to the first information, not to perform at least one of the LBT detection or the resource transmission, or to perform at least one of the LBT detection or the resource transmission for the first resource.

Optionally, the operation 202 may be replaced with operation 202a.

At operation 202a, in response to existence of a resource conflict, determine, according to the first information, not to perform at least one of the LBT detection or the resource transmission, or to perform at least one of the LBT detection or the resource transmission for the first resource.

The terminal device determines that the resource conflict includes at least one of:

(1) The terminal device determines that the resource conflict exists according to an indication from a network device;

(2) The terminal device determines that the resource conflict exists according to the first information; or (3) The terminal device takes that the resource conflict exists by default.

In the embodiments of the disclosure, the terminal device may determine whether the resource conflict exists, and in response to existence of a resource conflict, the terminal device may determine, according to the first information, not to perform at least one of the LBT detection or the resource transmission, or to perform at least one of the LBT detection or the resource transmission for the first resource. Thus, when the resource conflict exists, a method for performing LBT detection and/or resource transmission is provided, so that when the resource conflict exists, LBT detection conflicts and resource transmission conflicts can be avoided or reduced as much as possible, and transmission interference and waste of transmission resources can be reduced or avoided.

Optionally, in the embodiments of the disclosure, the terminal device may first determine whether the target value meets the first preset condition, and in response to the target value being less than or equal to the first preset condition, determine, according to the first information, to perform at least one of the LBT detection or the resource transmission for the first resource.

The first preset condition is used for determining whether LBT detection and/or resource transmission can be performed.

The first preset condition may include at least one preset condition.

Optionally, preset conditions corresponding to different resource objects are the same.

Optionally, preset conditions corresponding to different resource objects are different.

Optionally, the preset condition is determined according to at least one of: an indication from a network device, a default of a terminal device, or a condition predefined in a protocol.

Optionally, the operation 202 can be replaced with operation 202b.

At operation 202b, in response to a target value meeting a first preset condition, it is determined, according to the first information, to perform at least one of the LBT detection or the resource transmission for the first resource.

The target value is a random value, or the target value is a value corresponding to the first resource.

Optionally, the first preset condition corresponds to the first resource, and the first preset condition includes at least one preset condition.

Optionally, the target value meets a first preset condition, which may include:

A: the target value is less than or equal to a first preset threshold.

For example, the threshold (i.e., the first preset threshold) indicated by the network device is 2. When the value (such as priority, etc.) corresponding to the resource is less than or equal to 2, the terminal device may perform LBT detection and/or resource transmission for the resource.

For example, the threshold indicated by the network device is 0.6, and the terminal device randomly selects a value from 0 to 1 as the target value. When the target value is less than or equal to 0.6, the terminal device may determine to perform LBT detection and/or resource transmission; when the target value is greater than 0.6, the terminal device may determine not to perform LBT detection and/or resource transmission.

For example, assuming that the network device indicates a threshold of 0.8 to the PRACH resource/high priority resource/high priority terminal device, the PRACH/high priority resource/high priority terminal device is triggered to randomly select a value from 0 to 1. When the value is less than or equal to 0.8, LBT detection and/or resource transmission may be determined to be performed, and when the value is greater than 0.8, LBT detection and/or resource transmission may not be performed.

For example, assuming that the network device indicates a threshold of 0.6 to an uplink grant resource/low priority resource/low priority terminal device, a CG/low priority resource/low priority terminal device is triggered to randomly select a value from 0 to 1. When the value is less than or equal to 0.6, LBT detection and/or resource transmission may be determined to be performed, and when the value is greater than 0.6, LBT detection and/or resource transmission may not be performed.

B: the target value is greater than a second preset threshold.

For example, the threshold (i.e., the second preset threshold) indicated by the network device is 2. When the value (such as priority, etc.) corresponding to the resource is greater than 2, the terminal device may perform LBT detection and/or resource transmission for the resource.

For example, the threshold indicated by the network device is 0.6, and the terminal device randomly selects a value from 0 to 1 as the target value. When the target value is greater than 0.6, the terminal device may determine to perform LBT detection and/or resource transmission; when the target value is less than or equal to 0.6, the terminal device may not perform LBT detection and/or resource transmission.

C: the target value is within a preset threshold range.

Optionally, the target value is greater than a third preset threshold and less than a fourth preset threshold.

For example, the preset threshold range (i.e. the preset threshold range) indicated by the network device is greater than 0 and less than 2, when the value (such as priority, etc.) corresponding to the resource is 1, the terminal device may perform LBT detection and/or resource transmission for the resource, and when the value (such as priority, etc.) corresponding to the resource is 3, the terminal device may not perform LBT detection and/or resource transmission.

In the embodiments of the disclosure, the terminal device may determine whether the target value meets the first preset condition, and in response to the target value meeting the first preset condition, the terminal device may determine, according to first information, not to perform at least one of LBT detection or resource transmission, or to perform at least one of the LBT detection or the resource transmission for a first resource. Thus, when the target value meets the first preset condition, a method for performing LBT detection and/or resource transmission is provided, so that when the target value meets the first preset threshold, LBT detection conflicts and resource transmission conflicts can be avoided or reduced as much as possible, and transmission interference and waste of transmission resources can be reduced or avoided.

Optionally, in the embodiments of the disclosure, the terminal device may further perform LBT detection according to the second information.

The second information indicates at least one of:

a resource location, an FFP, a starting point of the FFP, an LBT period of FBE, or an LBT starting point of the FBE.

Optionally, the LBT detection may be an LBT detection for a UE-initial COT.

Optionally, the terminal device may receive the second information sent by the network device before performing, by the terminal device, the LBT detection according to the second information.

Optionally, the second information is indicated by the network device, or the second information is predefined in a protocol.

Further, after determining, according to first information, not to perform at least one of LBT detection or resource transmission, or to perform at least one of the LBT detection or the resource transmission for a first resource, the terminal device may perform LBT detection according to the second information according to another method for resource transmission. Thus, during resource transmission, a method for further avoiding LBT detection time with information such as the resource location, the FFP, the starting point of the FFP, the LBT period of the FBE, and the LBT starting time of the FBE is provided, so that LBT detection conflicts can be avoided or reduced as much as possible, and transmission interference and waste of transmission resources can be reduced or avoided.

Embodiment Two

Figure 3:
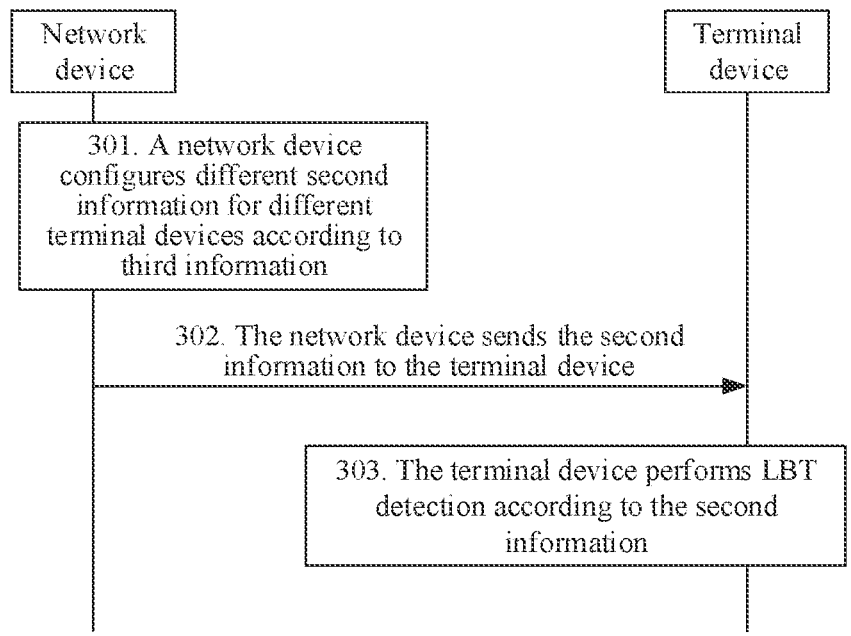
FIG. 3 is a second schematic diagram of a method for resource transmission according to an embodiment of the present disclosure.

As shown in FIG. 3, the embodiment of the disclosure provides a method for resource transmission, which includes operations as follows.

At operation 301, a network device configures different second information for different terminal devices according to third information.

The third information includes at least one of: at least one terminal device identifier; at least one terminal device group identifier, at least one resource location, an indication of an unlicensed spectrum or not, at least one resource priority, at least one terminal device priority, or at least one resource identifier.

Optionally, the at least one terminal device identifier may be represented as a list of terminal device identifiers that includes one or more terminal device identifiers.

Optionally, the at least one terminal device group identifier may be represented as a list of terminal device group identifiers that includes one or more terminal device group identifiers.

Optionally, the at least one resource location may be indicated by an identifier of the at least one resource location.

Optionally, it may be represented as a list of resource locations that includes one or more resource locations.

Optionally, the at least one resource priority may be represented as a list of resource priorities that includes one or more resource priority identifiers.

Optionally, the at least one terminal device priority may be represented as a list of terminal device priorities that includes one or more terminal device priority identifiers.

Optionally, the at least one resource identity can be represented as a list of resource identifiers that includes one or more resource identifiers.

Different resource identifiers may identify different resources.

At operation 302, the network device sends the second information to the terminal device.

The second information indicates at least one of: a resource location, an FFP, a starting point of the FFP, an LBT period of FBE, or an LBT starting time of the FBE.

At operation 303, the terminal device performs LBT detection according to the second information.

In the embodiment of the disclosure, the COT can be obtained by performing LBT detection.

The terminal device may perform the LBT detection according to the second information in different manners, several of which will be explained by example below.

Exemplarily, different UE identifiers correspond to different resource locations, or different UE identifiers correspond to different LBT periods of FBEs and/or LBT starting points of the FBEs.

Exemplarily, different UE group identifiers correspond to different resource locations, or different UE group identifiers correspond to different LBT periods of FBEs and/or LBT starting points of the FBEs.

Exemplarily, different UE identifiers correspond to different resource locations, or different UE identifiers correspond to different FFP s/starting points of the FFPs.

Exemplarily, different UE group identifiers correspond to different resource locations, or different UE group identifiers correspond to different FFPs and/or starting points of the FFPs.

Exemplarily, resources or UEs of the same priority have different resource locations.

Exemplarily, resources or UEs of the same priority correspond to different LBT starting points of FBEs and/or LBT periods of the FBEs.

Exemplarily, resources or UEs of the same priority correspond to different FFPs and/or starting points of the FFPs.

According to the method for resource transmission according to the embodiments of the disclosure, the terminal device may perform LBT detection according to second information. The second information indicates at least one of: a resource location, an FFP, a starting point of the FFP, an LBT period of FBE, or an LBT starting time of the FBE. As such, a method of staggering LBT detection time with information such as the resource location, the FFP, the starting point of the FFP, the LBT period of the FBE, and the LBT starting time of the FBE is provided during resource transmission, so that LBT detection conflicts can be staggered or reduced as much as possible, and transmission interference and waste of transmission resources can be reduced or avoided.

Embodiment Three

Figure 4:
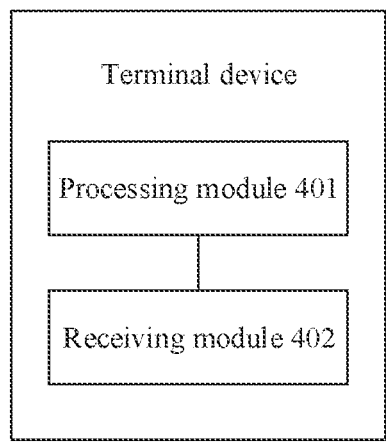
FIG. 4 is a first schematic structural diagram of a terminal device according to an embodiment of the present disclosure.

As shown in FIG. 4, the embodiment of the present disclosure provides a terminal device, which includes: a processing module 401, configured to determine, according to first information, not to perform at least one of LBT detection or resource transmission, or to perform at least one of the LBT detection or the resource transmission for a first resource.

The first information indicates at least one of: a second resource; performing at least one of the LBT detection or the resource transmission; or not performing at least one of the LBT detection or the resource transmission.

Optionally, the first resource includes one of: any resource, a part of resources, all of the resources, a specific resource, or a resource for a specific object.

Optionally, the resource for the specific object include at least one of: a resource for a specific logical channel, a resource for a specific service, a resource for a specific priority, a resource for a specific identifier, a resource for a specific terminal device, or a resource for a specific type.

Optionally, the resource for the specific priority include at least one of: a resource for a specific resource priority; a resource for a specific-priority service; or a resource corresponding to a specific-priority service when the specific-priority service exists, or a resource corresponding to a logical channel when the logical channel has data to be transmitted.

Optionally, the specific terminal device includes at least one of: a terminal device with a specific priority, a terminal device in a specific group, a terminal device with a specific identifier, or a terminal device with a specific capability.

Optionally, the resource for the specific type include at least one of: a PRACH resource, a DG resource, a CG resource, a PUSCH resource, or a PUCCH resource.

Optionally, the terminal device further includes: a receiving module 402, configured to receive the first information indicated by a network device before determining, by the processing module 401 according to the first information, not to perform at least one of the LBT detection or the resource transmission, or to perform at least one of the LBT detection or the resource transmission for the first resource.

Optionally, the processing module 401 is configured to: in response to existence of a resource conflict, determine, according to the first information, not to perform at least one of the LBT detection or the resource transmission, or to perform at least one of the LBT detection or the resource transmission for the first resource.

Optionally, the resource conflict includes at least one of: determining that the resource conflict exists according to an indication from a network device; determining that the resource conflict exists according to the first information; or taking that the resource conflict exists by default by the terminal device.

Optionally, the processing module 401 is configured to: in response to a target value meeting a first preset condition, determine, according to the first information, to perform at least one of the LBT detection or the resource transmission for the first resource, The target value is a random value, or the target value is a value corresponding to the first resource.

Optionally, the first preset condition corresponds to the first resource; the first preset condition includes at least one preset condition; and preset conditions corresponding to different resource objects are same or different.

Optionally, the preset condition is determined according to at least one of: an indication from a network device, a default of a terminal device, or a condition predefined in a protocol.

Optionally, the terminal device operates on an unlicensed spectrum, or the terminal device operates on a licensed spectrum.

Optionally, the processing module 401 is further configured to perform the LBT detection according to second information.

The second information indicates at least one of: a resource location, an FFP, a starting time of the FFP, an LBT period of FBE, or an LBT starting time of the FBE.

Optionally, the terminal device further includes: a receiving module 402, configured to receive the second information sent by a network device before performing, by the terminal device, the LBT detection according to the second information.

Optionally, the second information and the first information are determined according to at least one of: an indication from a network device, or information predefined in a protocol.

Figure 5:
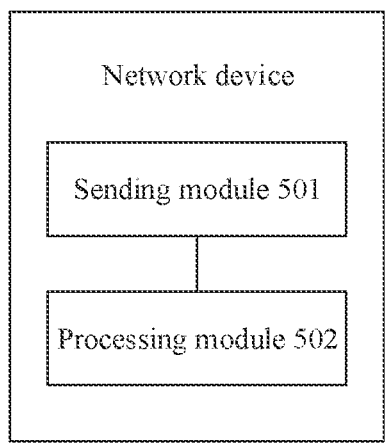
FIG. 5 is a first schematic structural diagram of a network device according to an embodiment of the present disclosure.

As shown in FIG. 5, the embodiment of the present disclosure provides a network device, which includes: a sending module 501, configured to indicate first information to a terminal device, herein the first information indicates at least one of: a second resource; performing at least one of LBT detection, or resource transmission; or not performing at least one of the LBT detection or the resource transmission.

Optionally, the second resource includes one of: any resource, a part of resources, all of the resources, a specific resource, or a resource for a specific object.

Optionally, the resource for the specific object includes at least one of: a resource for a specific logical channel, a resource for a specific service, a resource for a specific priority, a resource for a specific identifier, a resource for a specific terminal device, or a resource for a specific type.

Optionally, the resource for the specific priority includes at least one of: a resource for a specific resource priority; a resource for a specific-priority service; or a resource corresponding to a specific-priority service when the specific-priority service exists, or a resource corresponding to a logical channel when the logical channel has data to be transmitted.

Optionally, the specific terminal device includes at least one of: a terminal device with a specific priority, a terminal device in a specific group, a terminal device with a specific identifier, or a terminal device with a specific capability.

Optionally, the resource for the specific type includes at least one of resources: a PRACH resource, a DG resource, a CG resource, a PUSCH resource, or a PUCCH resource.

Optionally, the sending module 501 is further configured to indicate existence of a resource conflict to the terminal device.

Optionally, the sending module 501 is further configured to indicate at least one preset condition to the terminal device, herein preset conditions corresponding to different resource objects are same or different.

Optionally, the preset condition is determined according to at least one of: an indication from a network device, a default of the terminal device, or a condition predefined in a protocol.

Optionally, the sending module 501 is further configured to send second information to the terminal device, herein the second information indicates at least one of: a resource location, an FFP, a starting time of the FFP, an LBT period of FBE, or an LBT starting time of the FBE.

Optionally, the network device further includes: a processing module 502, configured to configure, according to third information, different second information for different terminal devices before the sending module 501 sends the second information to the terminal device.

The third information includes at least one of: at least one terminal device identifier, at least one terminal device group identifier, at least one resource location, an indication of an unlicensed spectrum or not, at least one resource priority, at least one terminal device priority, or at least one resource identifier.

Optionally, the second information and the first information are determined according to at least one of: an indication from a network device, or information predefined in a protocol.

Figure 6:
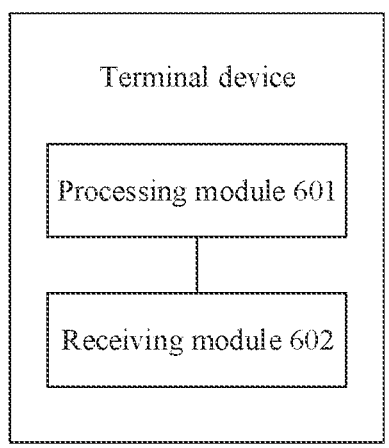
FIG. 6 is a second schematic structural diagram of a terminal device according to an embodiment of the present disclosure.

As shown in FIG. 6, the embodiment of the present disclosure provides a terminal device, which includes: a processing module 601, configured to perform LBT detection according to second information.

The second information indicates at least one of: a resource location, an FFP, a starting point of the FFP, an LBT period of FBE, or an LBT starting time of the FBE.

Optionally, the terminal device further includes: a receiving module 602, configured to receive the second information sent by a network device before performing, by the terminal device, the LBT detection according to the second information.

Optionally, the second information and the first information are determined according to at least one of: an indication from a network device, or information predefined in a protocol.

Figure 7:
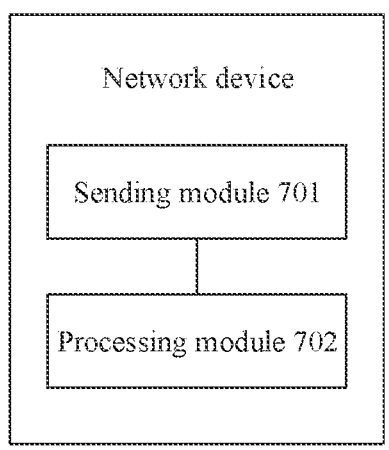
FIG. 7 is a second schematic structural diagram of a network device according to an embodiment of the present disclosure.

As shown in FIG. 7, the embodiment of the present disclosure provides a network device, which includes: a sending module 701, configured to send second information to a terminal device, herein the second information indicates at least one of: a resource location, an FFP, a starting point of the FFP, a LBT period of FBE, or an LBT starting time of the FBE.

Optionally, the network device further includes: a processing module 702, configured to configure, according to third information, different second information for different terminal devices before the sending module 701 sends the second information to the terminal device.

The third information includes at least one of: at least one terminal device identifier, at least one terminal device group identifier, at least one resource location, an indication of an unlicensed spectrum or not, at least one resource priority, at least one terminal device priority, or at least one resource identifier.

Optionally, the second information and the first information are determined according to at least one of: an indication from a network device, or information predefined in a protocol.

The embodiment of the disclosure further provides a terminal device, which includes: a memory storing executable program codes; and a processor coupled to the memory.

The processor calls the executable program code stored in the memory to execute the resource transfer method executed by the terminal device (which may be the terminal device shown in FIG. 4 or FIG. 6) in the embodiment of the present disclosure.

The embodiment of the disclosure further provides a network device, which includes: a memory storing executable program codes and a processor.

The processor is coupled to the memory.

The processor calls the executable program codes stored in the memory to perform the method for resource transmission executed by the network device (which may be the network device shown in FIG. 5 or FIG. 7) in the embodiments of the present disclosure.

Figure 8:
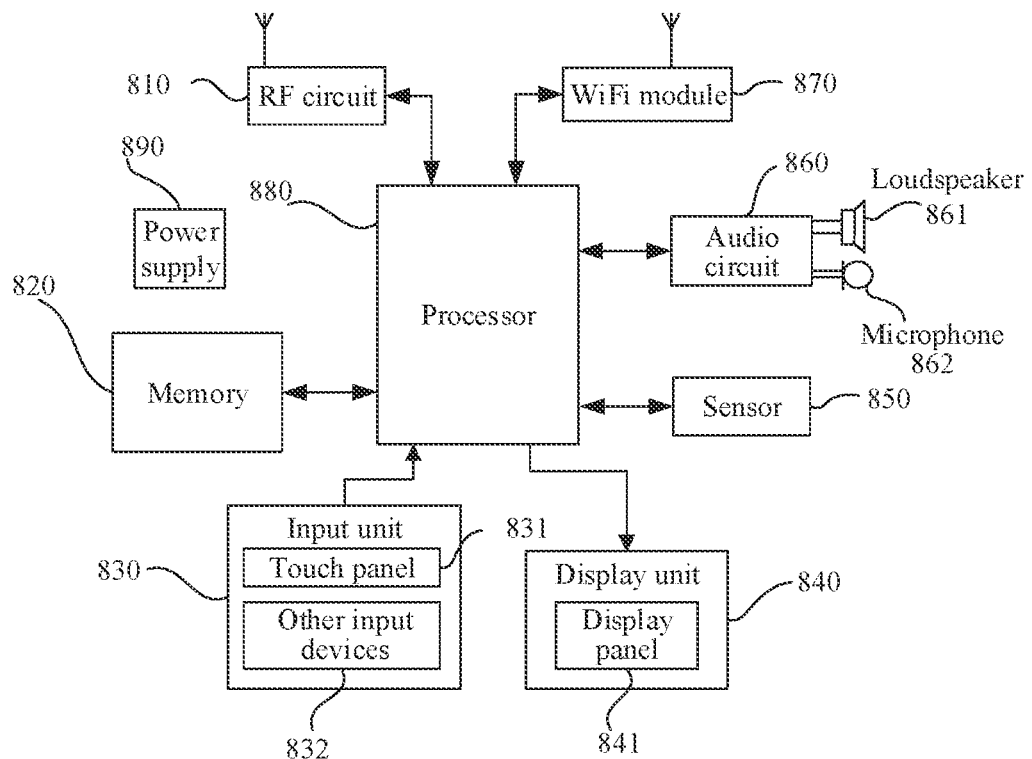
FIG. 8 is a schematic structural diagram of a mobile phone according to an embodiment of the disclosure.

Exemplarily, the terminal device in the embodiments of the present disclosure may be a mobile phone, as shown in FIG. 8, the mobile phone may include: a Radio Frequency (RF) circuit 810, a memory 820, an input unit 830, a display unit 840, a sensor 850, an audio circuit 860, a Wireless Fidelity (WiFi) module 870, a processor 880, a power supply 890, and other components. The radio frequency circuit 810 includes a receiver 811 and a transmitter 812. Those skilled in the art will appreciate that the mobile phone configuration shown in FIG. 8 is not limiting to the mobile phone and may include more or fewer components than illustrated, or a combination of certain components, or different component arrangements.

The RF Circuit 810 may be used for receiving and sending signals during sending and receiving information or talking. In particular, the downlink information of the base station is received and then processed by the processor 880. In addition, the design uplink data is sent to the base station. Generally, the RF Circuit 810 includes but is not limited to an antenna at least one amplifier, a transceiver, a coupler, a Low Noise Amplifier (LNA), a diplexer and the like. In addition, the RF Circuit 810 may also communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 820 may be configured to store a software program and a module, and the processor 880 executes various function APPs and data processing of the mobile phone by running the software program and the module stored in the memory 820. The memory 820 may mainly include a storage program region and a storage data region, where the storage program region may store an operation system, an APP needed for at least one function (such as a sound playback function, an image playback function, etc.), and the like; and the storage data region may store data (such as audio data, phone book, etc.) created according to use of the mobile phone. In addition, the memory 820 may include a high-speed RAM, and may further include a non-volatile memory such as a disk storage device, a flash device, or other non-volatile solid storage devices The input unit 830 may be used to receive inputted numeric or character information and to generate key signal input related to user settings and function control of the mobile phone. Specifically, the input unit 830 may include a touch panel 831 and other input devices 832. the touch panel 831, also referred to as a touch screen, may collect user touch operations on or near the touch panel 831 (such as user operations on or near the touch panel 831 using any suitable object or accessory such as a finger, stylus, etc.), and drive corresponding connection devices according to a preset program. Alternatively, the touch panel 831 may include two parts of a touch detection device and a touch controller. The touch detection device detects the touch orientation of the user, detects the signal brought by the touch operation, and transmits the signal to the touch controller. The touch controller receives the touch information from the touch detection device, converts it into contact coordinates, sends it to the processor 880, and may receive and execute commands from the processor 880. In addition, the touch panel 831 may be implemented in various types such as resistive, capacitive, infrared, and surface acoustic waves. The input unit 830 may include other input devices 832 in addition to the touch panel 831. Specifically, other input devices 832 may include, but not limited to, one or more of a physical keyboard, a function key (for example, a volume control key and an on-off key), a trackball, a mouse, a joystick and the like.

The display unit 840 may be used to display information input by or provided to a user and various menus of a mobile phone. The display unit 840 may include a display panel 841 which may optionally be configured in the form of a Liquid Crystal Display (LCD), an Organic Light-Emitting Diode (OLED), or the like. Further, the touch panel 831 may overlay the display panel 841, and when the touch panel 831 detects a touch operation on or near it, it is transmitted to the processor 880 to determine a type of touch event, and then the processor 880 provides a corresponding visual output on the display panel 841 according to the type of the touch event. In FIG. 8, although the touch panel 831 and the display panel 841 are two independent components to implement the input and input functions of the mobile phone, in some embodiments, the touch panel 831 and the display panel 841 may be integrated to implement the input and output functions of the mobile phone.

The mobile phone may further include at least one sensor 850, for example, a light sensor, a motion sensor and another sensor. Specifically, the light sensor may include an environmental light sensor and a proximity sensor, herein the environmental light sensor may regulate brightness of the display panel 841 according to brightness of environmental light, and the proximity sensor may turn off the display panel 841 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone, and will not be elaborated herein.

The audio circuit 860, a loudspeaker 861 and a microphone 862 may provide an audio interface between the user and the mobile phone. The audio circuit 860 may transmit an electric signal converted from received audio data to the loudspeaker 861, and then the loudspeaker 861 converts it into a sound signal for output. On the other aspect, the microphone 862 converts a collected sound signal into an electric signal, and then the audio circuit 860 receives and converts it into audio data and outputs the audio data to the processor 880 for processing and sending to, for example, another mobile phone through the RF circuit 810 or outputs the audio data to the memory 820 for further processing.

WiFi is a short-distance wireless communication technology. The mobile phone may help the user to receive and send an electronic mail, browse a webpage, access streaming media and the like through the WiFi module 870, and provides wireless broadband Internet access for the user. Although the WiFi module 870 is illustrated in FIG. 8, it can be understood that it is not a necessary component of the mobile phone and may completely be omitted according to a requirement without changing the scope of the essence of the disclosure.

The processor 880 is a control center of the mobile phone, connects each part of the whole mobile phone by virtue of various interfaces and lines and executes various functions and data processing of the mobile phone by operating or executing the software program and/or module stored in the memory 820 and calling data stored in the memory 820, thereby monitoring the whole mobile phone. Alternatively, the processor 880 may include one or more processing units. Preferably, the processor 880 may integrate an application processor and a modulation and demodulation processor, herein the application processor mainly processes the operating system, a user interface, an application program and the like, and the modulation and demodulation processor mainly processes wireless communication. It can be understood that the modulation and demodulation processor may also not be integrated into the processor 880.

The mobile phone further includes the power supply 890 (for example, a battery) supplying power to each component. Preferably, the power supply may be logically connected with the processor 880 through a power management system, thereby realizing functions of charging and discharging management, power consumption management and the like through the power management system. Although not illustrated in the figure, the mobile phone may further include a camera, a Bluetooth module and the like, which will not be elaborated herein.

In one implementation of the embodiments of the present disclosure, a processor 880 is configured to determine, according to first information, not to perform at least one of LBT detection or resource transmission, or to perform at least one of the LBT detection or the resource transmission for a first resource.

The first information indicates at least one of: a second resource; performing at least one of the LBT detection or the resource transmission; or not performing at least one of the LBT detection or the resource transmission.

Optionally, the first resource includes one of: any resource, a part of resources, all of the resources, a specific resource, or a resource for a specific object.

Optionally, the resource for the specific object includes at least one of: a resource for a specific logical channel, a resource for a specific service, a resource for a specific priority, a resource for a specific identifier, a resource for a specific terminal device, or a resource for a specific type.

Optionally, the resource for the specific priority includes at least one of: a resource for a specific resource priority; a resource for a specific-priority service; or a resource corresponding to a specific-priority service when the specific-priority service exists, or a resource corresponding to a logical channel when the logical channel has data to be transmitted.

Optionally, the specific terminal device includes at least one of: a terminal device with a specific priority, a terminal device in a specific group, a terminal device with a specific identifier, or a terminal device with a specific capability.

Optionally, the resource for the specific type includes at least one of: a PRACH resource, a DG resource, a CG resource, a PUSCH resource, or, a PUCCH resource.

Optionally, the terminal device further includes: an RF circuit 810, configured to receive the first information indicated by a network device before determining, by the processor 880 according to the first information, not to perform at least one of the LBT detection or the resource transmission, or to perform at least one of the LBT detection or the resource transmission for the first resource.

Optionally, the processor 880 is configured to: in response to existence of a resource conflict, determine, according to the first information, not to perform at least one of the LBT detection or the resource transmission, or to perform at least one of the LBT detection or the resource transmission for the first resource.

Optionally, the resource conflict includes at least one of: determining that the resource conflict exists according to an indication from a network device; determining that the resource conflict exists according to the first information; or taking that the resource conflict exists by default by the terminal device.

Optionally, the processor 880 is configured to: in response to a target value meeting a first preset condition, determine, according to the first information, to perform at least one of the LBT detection or the resource transmission for the first resource.

The target value is a random value, or the target value is a value corresponding to the first resource.

Optionally, the first preset threshold corresponds to the first resource; the first preset threshold includes at least one preset condition; and preset conditions corresponding to different resource objects are same or different.

Optionally, the preset condition is determined according to at least one of: an indication from a network device, a default of a terminal device, or a condition predefined in a protocol.

Optionally, the terminal device operates on an unlicensed spectrum, or the terminal device operates on a licensed spectrum.

Optionally, the processor 880 is configured to perform the LBT detection according to second information.

The second information indicates at least one of: a resource location, an FFP, a starting time of the FFP, an LBT period of FBE, or an LBT starting time of the FBE.

Optionally, the terminal device further includes: an RF circuit 810, configured to receive the second information sent by a network device before performing, by the terminal device, the LBT detection according to the second information.

Optionally, the second information and the first information are determined according to at least one of: an indication from a network device, or information predefined in a protocol.

In another implementation of the embodiments of the present disclosure, the processor 880 is configured to perform LBT detection according to second information.

The second information indicates at least one of: a resource location, an FFP, a starting point of the FFP, an LBT period of FBE, or an LBT starting time of the FBE.

Optionally, the terminal device further includes: an RF circuit 810, configured to receive the second information sent by a network device before performing, by the terminal device, the LBT detection according to the second information.

Optionally, the second information and the first information are determined according to at least one of: an indication from a network device, or information predefined in a protocol.

Figure 9:
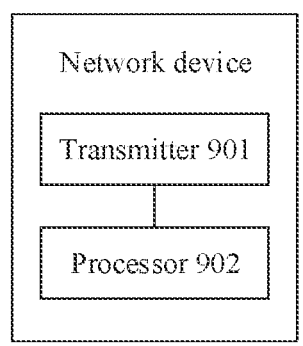
FIG. 9 is a schematic structural diagram of a base station according to an embodiment of the present disclosure.

Exemplarily, as shown in FIG. 9, the network device in the embodiment of the present disclosure may be a base station, which includes: a transmitter 901 and a processor 902.

In an implementation of the embodiment of the disclosure, a transmitter 901 is configured to indicate first information to a terminal device, herein the first information indicates at least one of: a second resource; performing at least one of LBT detection, or resource transmission; or not performing at least one of the LBT detection or the resource transmission.

Optionally, the second resource includes one of: any resource, a part of resources, all of the resources, a specific resource, or a resource for a specific object.

Optionally, the resource for the specific object includes at least one of: a resource for a specific logical channel, a resource for a specific service, a resource for a specific priority, a resource for a specific identifier, a resource for a specific terminal device, or a resource for a specific type.

Optionally, the resource for the specific priority includes at least one of: a resource for a specific resource priority; a resource for a specific-priority service; or a resource corresponding to a specific-priority service when the specific-priority service exists, or a resource corresponding to a logical channel when the logical channel has data to be transmitted.

Optionally, the specific terminal device includes at least one of: a terminal device with a specific priority, a terminal device in a specific group, a terminal device with a specific identifier, or a terminal device with a specific capability.

Optionally, the resource for the specific type includes at least one of resources: a PRACH resource, a DG resource, a CG resource, a PUSCH resource, or a PUCCH resource.

Optionally, the transmitter 901 is further configured to indicate existence of a resource conflict to the terminal device.

Optionally, the transmitter 901 is further configured to indicate at least one preset condition to the terminal device, herein preset conditions corresponding to different resource objects are same or different.

Optionally, the preset condition is determined according to at least one of: an indication from a network device, a default of the terminal device, or a condition predefined in a protocol.

Optionally, the transmitter 901 is further configured to send second information to the terminal device, herein the second information indicates at least one of: a resource location, an FFP, a starting time of the FFP, an LBT period of FBE, or an LBT starting time of the FBE.

Optionally, the terminal device further includes: a processor 902, configured to configure, according to third information, different second information for different terminal devices before the transmitter 901 sends the second information to the terminal device.

The third information includes at least one of: at least one terminal device identifier, at least one terminal device group identifier, at least one resource location, an indication of an unlicensed spectrum or not, at least one resource priority, at least one terminal device priority, or at least one resource identifier.

Optionally, the second information and the first information are determined according to at least one of: an indication from a network device, or information predefined in a protocol.

In another implementation of the embodiment of the disclosure, a transmitter 901 is configured to send second information to a terminal device, herein the second information indicates at least one of: a resource location, an FFP, a starting point of the FFP, a LBT period of FBE, or an LBT starting time of the FBE.

Optionally, the network device further includes: a processor 902, configured to configure, according to third information, different second information for different terminal devices before the transmitter 901 sends the second information to the terminal device.

The third information includes at least one of: at least one terminal device identifier, at least one terminal device group identifier, at least one resource location, an indication of an unlicensed spectrum or not, at least one resource priority, at least one terminal device priority, or at least one resource identifier.

Optionally, the second information and the first information are determined according to at least one of: an indication from a network device, or information predefined in a protocol.

The embodiment of the present disclosure further provides a computer-readable storage medium including computer instructions, which, when being executed on a computer, cause the computer to perform various processes of the terminal device as in the above method embodiments.

The embodiment of the present disclosure further provides a computer-readable storage medium including computer instructions, which, when being executed on a computer, cause the computer to perform various processes of the network device as in the above method embodiments.

The embodiment of the present disclosure further provides a computer program product, including: computer instructions, which, when being executed on a computer, cause the computer to perform various processes of the terminal device as in the above method embodiments.

The embodiment of the present disclosure further provides a computer program product, including: computer instructions, which, when being executed on a computer, cause the computer to perform various processes of the network device as in the above method embodiments.

The embodiment of the present disclosure further provides a chip. The chip is coupled to a memory in a terminal device and calls, during operation, program instructions stored in the memory, to cause the terminal device to perform various processes of the terminal device as in the above method embodiments.

The embodiment of the present disclosure further provides a chip. The chip is coupled to a memory in a network device and calls, during operation, program instructions stored in the memory, to cause the network device to perform various processes of the network device as in the above method embodiments.

The embodiments of the disclosure provide a method for resource transmission, a terminal device and a network device, which can reduce or avoid transmission interference and waste of transmission resources.

In a first aspect, there is provided a method for resource transmission, including: determining, according to first information, not to perform at least one of Listen Before Talk (LBT) detection or resource transmission, or to perform at least one of the LBT detection or the resource transmission for a first resource, herein the first information indicates at least one of: a second resource; performing at least one of the LBT detection or the resource transmission; or not performing at least one of the LBT detection or the resource transmission.

In a second aspect, there is provided a method for resource transmission, including: indicating first information to a terminal device, herein the first information indicates at least one of: a second resource; performing at least one of LBT detection, or resource transmission; or not performing at least one of the LBT detection or the resource transmission.

In a third aspect, there is provided a method for resource transmission, including: performing, by a terminal device, LBT detection according to second information, herein the second information indicates at least one of: a resource location, a Fixed Frame Period (FFP), a starting point of the FFP, an LBT period of Frame Based Equipment (FBE), or an LBT starting time of the FBE.

In a fourth aspect, there is provided a method for resource transmission, including: sending second information to a terminal device, herein the second information indicates at least one of: a resource location, an FFP, a starting point of the FFP, an LBT period of FBE, or an LBT starting time of the FBE.

In a fifth aspect, there is provided a terminal device, including: a processing module, configured to determine, according to first information, not to perform at least one of LBT detection or resource transmission, or to perform at least one of the LBT detection or the resource transmission for a first resource, herein the first information indicates at least one of: a second resource; performing at least one of the LBT detection or the resource transmission; or not performing at least one of the LBT detection or the resource transmission.

In a sixth aspect, there is provided a network device, including: a sending module, configured to indicate first information to a terminal device, herein the first information indicates at least one of: a second resource; performing at least one of LBT detection, or resource transmission; or not performing at least one of the LBT detection or the resource transmission.

In a seventh aspect, there is provided a terminal device, including: a processing module, configured to perform LBT detection according to second information, herein the second information indicates at least one of: a resource location, an FFP, a starting point of the FFP, an LBT period of FBE, or an LBT starting time of the FBE.

In an eighth aspect, there is provided a network device, including: a sending module, configured to send second information to a terminal device, herein the second information indicates at least one of: a resource location, an FFP, a starting point of the FFP, an LBT period of FBE, or an LBT starting time of the FBE.

In a ninth aspect, there is provided a terminal device, including: a processor, configured to determine, according to first information, not to perform at least one of LBT detection or resource transmission, or to perform at least one of the LBT detection or the resource transmission for a first resource, herein the first information indicates at least one of: a second resource; performing at least one of the LBT detection or the resource transmission; or not performing at least one of the LBT detection or the resource transmission.

In a tenth aspect, there is provided a network device, including: a transmitter, configured to indicate first information to a terminal device, herein the first information indicates at least one of: a second resource; performing at least one of LBT detection, or resource transmission; or not performing at least one of the LBT detection or the resource transmission.

In an eleventh aspect, there is provided a terminal device, including: a processor, configured to perform LBT detection according to second information, herein the second information indicates at least one of: a resource location, an FFP, a starting point of the FFP, an LBT period of FBE, or an LBT starting time of the FBE.

In a twelfth aspect, there is provided a network device, including: a transmitter, configured to send second information to a terminal device, herein the second information indicates at least one of: a resource location, an FFP, a starting point of the FFP, an LBT period of FBE, or an LBT starting time of the FBE.

In a thirteenth aspect, there is provided a computer-readable storage medium including computer instructions that, when executed on a computer, cause the computer to perform a method of the first aspect described above or any alternative implementation of the first aspect, or a method of the third aspect described above or any alternative implementation of the third aspect.

In a fourteenth aspect, there is provided a computer-readable storage medium including computer instructions that, when executed on a computer, cause the computer to perform a method of the second aspect described above or any alternative implementation of the second aspect, or a method of the fourth aspect described above or any alternative implementation of the fourth aspect.

In a fifteenth aspect, there is provided a computer program product including computer instructions that, when executed by a computer, cause the computer to perform a method of the first aspect described above or any alternative implementation of the first aspect, or a method of the third aspect described above or any alternative implementation of the third aspect.

In a sixteenth aspect, there is provided a computer program product including computer instructions that, when executed by a computer, cause the computer to perform a method of the second aspect described above or any alternative implementation of the second aspect, or a method of the fourth aspect described above or any alternative implementation of the fourth aspect.

In a seventeenth, there is provided a chip, which is coupled to a memory in a terminal device and calls, when executed, program instructions stored in the memory, to cause the terminal device to perform a method of the first aspect described above or any alternative implementation of the first aspect, or to cause the a network device to perform a method of the third aspect described above or any alternative implementation of the third aspect.

In an eighteenth aspect, there is provided a chip, which is coupled to a memory in a terminal device and calls, when executed, program instructions stored in the memory, to cause the terminal device to perform a method of the second aspect described above or any alternative implementation of the second aspect, or to cause the a network device to perform a method of the fourth aspect described above or any alternative implementation of the fourth aspect.

According to the method for resource transmission of the embodiments of the disclosure, the terminal device may determine, according to first information, not to perform at least one of LBT detection or resource transmission, or to perform at least one of the LBT detection or the resource transmission for a first resource. The first information indicates at least one of: a second resource; performing at least one of the LBT detection or the resource transmission; or not performing at least one of the LBT detection or the resource transmission. As such, a method for performing LBT detection and/or resource transmission is provided during resource transmission, so that LBT detection conflicts and resource transmission conflicts can be staggered or reduced as much as possible, and transmission interference and waste of transmission resources can be reduced or avoided.

According to another method for resource transmission according to the embodiments of the disclosure, the terminal device may perform LBT detection according to second information. The second information indicates at least one of: a resource location, an FFP, a starting point of the FFP, an LBT period of FBE, or an LBT starting time of the FBE. As such, a method of staggering LBT detection time with information such as the resource location, the FFP, the starting point of the FFP, the LBT period of the FBE, and the LBT starting time of the FBE is provided during resource transmission, so that LBT detection conflicts can be staggered or reduced as much as possible, and transmission interference and waste of transmission resources can be reduced or avoided.

In the above embodiments, it may be implemented in whole or in part by software, hardware, firmware, or any combination thereof. When the software is used for implementation, it may be implemented in whole or in part in the form of the computer program product. The computer program product includes one or more computer instructions. When the above computer program instruction is loaded and executed on a computer, the above processes or functions according to the embodiments of the disclosure are generated in whole or in part. The above computer may be a general computer, a special computer, a computer network, or other programmable apparatus. The above computer instruction may be stored in the computer-readable storage medium or transmitted from one computer-readable storage medium to another computer-readable storage medium. For example, the above computer instruction may be transmitted from a website site, a computer, a server, or a data center to another web site site, another computer, another server, or another data center via wire (for example, a coaxial cable, an optical fiber, a Digital Subscriber Line (DSL)) or wireless (for example, infrared, wireless, microwave, or the like). The computer-readable storage medium may be any available medium that can be accessed by a computer, or a data storage device, such as a server and a data center, that includes one or more available mediums integrated. The above available medium may be a magnetic medium (for example, a floppy disk, a hard disk, and a magnetic tape), an optical medium (for example, DVD), or a semiconductor medium (for example, Solid State Disk (SSD)), and the like.

Terms "first", "second", "third", "fourth" and the like (if exists) in the description, claims and the above-mentioned drawings of this application are used for distinguishing similar objects rather than describing a specific sequence or a precedence order. It should be understood that the data used in such a way may be exchanged where appropriate, in order that the embodiments described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The invention claimed is:

1. A method for resource transmission, comprising:
determining, according to first information, not to perform at least one of Listen Before Talk (LBT) detection or resource transmission, or to perform at least one of the LBT detection or the resource transmission for a first resource,
wherein the first information indicates at least one of:
a second resource;
performing at least one of the LBT detection or the resource transmission; or
not performing at least one of the LBT detection or the resource transmission,
wherein the determining, according to the first information, to perform at least one of the LBT detection or the resource transmission for the first resource comprises:
in response to existence of a resource conflict, determining, according to the first information, not to perform at least one of the LBT detection or the resource transmission, or to perform at least one of the LBT detection or the resource transmission for the first resource,
wherein the resource conflict comprises at least one of:
determining that the resource conflict exists according to an indication from a network device;
determining that the resource conflict exists according to the first information; or
taking that the resource conflict exists by default by the terminal device.

2. The method of claim 1, wherein the first resource comprises one of:
any resource, a part of resources, all of the resources, a specific resource, or a resource for a specific object.

3. The method of claim 2, wherein the resource for the specific object comprises at least one of:
a resource for a specific logical channel, a resource for a specific service, a resource for a specific priority, a resource for a specific identifier, a resource for a specific terminal device, or a resource for a specific type.

4. The method of claim 3, wherein the resource for the specific priority comprises at least one of: a resource for a specific resource priority; a resource for a specific-priority service; or a resource corresponding to a specific-priority service when the specific-priority service exists, or a resource corresponding to a logical channel when the logical channel has data to be transmitted;
or,
wherein the specific terminal device comprises at least one of: a terminal device with a specific priority, a terminal device in a specific group, a terminal device with a specific identifier, or a terminal device with a specific capability;
or,
wherein the resource for the specific type comprises at least one of: a Physical Random Access Channel (PRACH) resource, a Dynamic Grant (DG) resource, a Configured Grant (CG) resource, a Physical Uplink Shared Channel (PUSCH) resource, or a Physical Uplink Control Channel (PUCCH) resource.

5. The method of claim 1, further comprising: before determining, according to the first information, not to perform at least one of the LBT detection or the resource transmission, or to perform at least one of the LBT detection or the resource transmission for the first resource,
receiving the first information indicated by a network device.

6. A method for resource transmission, comprising:
determining, according to first information, not to perform at least one of Listen Before Talk (LBT) detection or resource transmission, or to perform at least one of the LBT detection or the resource transmission for a first resource,
wherein the first information indicates at least one of:
a second resource;
performing at least one of the LBT detection or the resource transmission; or
not performing at least one of the LBT detection or the resource transmission,
wherein the determining, according to the first information, to perform at least one of the LBT detection or the resource transmission for the first resource comprises:
in response to a target value meeting a first preset condition, determining, according to the first information, to perform at least one of the LBT detection or the resource transmission for the first resource,
wherein the target value is a random value, or the target value is a value corresponding to the first resource,
wherein the first preset condition corresponds to the first resource; the first preset condition comprises at least one preset condition; and preset conditions corresponding to different resource objects are same or different, and
wherein the preset condition is determined according to at least one of: an indication from a network device, a default of a terminal device, or a condition predefined in a protocol.

7. The method of claim 1, wherein the method is executed by a terminal device,
wherein the terminal device operates on an unlicensed spectrum, or the terminal device operates on a licensed spectrum.

8. The method of claim 7, further comprising:
performing, by the terminal device, the LBT detection according to second information,
wherein the second information indicates at least one of: a resource location, a Fixed Frame Period (FFP), a starting time of the FFP, an LBT period of Frame Based Equipment (FBE), or an LBT starting time of the FBE, and
wherein the method further comprises: before performing, by the terminal device, the LBT detection according to the second information,
receiving the second information sent by a network device.

9. The method of claim 8, wherein the second information and the first information are determined according to at least one of:
an indication from a network device, or information predefined in a protocol.

10. A terminal device, comprising:
a processor, configured to determine, according to first information, not to perform at least one of Listen Before Talk (LBT) detection or resource transmission, or to perform at least one of the LBT detection or the resource transmission for a first resource,
wherein the first information indicates at least one of:
a second resource;
performing at least one of the LBT detection or the resource transmission; or not performing at least one of the LBT detection or the resource transmission,
wherein the processor is configured to: in response to existence of a resource conflict, determine, according to the first information, not to perform at least one of the LBT detection or the resource transmission, or to perform at least one of the LBT detection or the resource transmission for the first resource,
wherein the resource conflict comprises at least one of:
determining that the resource conflict exists according to an indication from a network device;
determining that the resource conflict exists according to the first information; or
taking that the resource conflict exists by default by the terminal device.

11. The terminal device of claim 10, wherein the first resource comprises one of:
any resource, a part of resources, all of the resources, a specific resource, or a resource for a specific object.

12. The terminal device of claim 11, wherein the resource for the specific object comprises at least one of:
a resource for a specific logical channel, a resource for a specific service, a resource for a specific priority, a resource for a specific identifier, a resource for a specific terminal device, or a resource for a specific type.

13. The terminal device of claim 12, wherein the resource for the specific priority comprises at least one of: a resource for a specific resource priority; a resource for a specific-priority service; or a resource corresponding to a specific-priority service when the specific-priority service exists, or a resource corresponding to a logical channel when the logical channel has data to be transmitted;
or,
wherein the specific terminal device comprises at least one of: a terminal device with a specific priority, a terminal device in a specific group, a terminal device with a specific identifier, or a terminal device with a specific capability;
or,
wherein the resource for the specific type comprises at least one of: a Physical Random Access Channel (PRACH) resource, a Dynamic Grant (DG) resource, a Configured Grant (CG) resource, a Physical Uplink Shared Channel (PUSCH) resource, or a Physical Uplink Control Channel (PUCCH) resource.

14. The terminal device of claim 10, further comprising:
a receiver, configured to receive the first information indicated by a network device, before determining, by the processor according to the first information, not to perform at least one of the LBT detection or the resource transmission, or to perform at least one of the LBT detection or the resource transmission for the first resource.

15. A terminal device, comprising:
a processor, configured to determine, according to first information, not to perform at least one of Listen Before Talk (LBT) detection or resource transmission, or to perform at least one of the LBT detection or the resource transmission for a first resource,
wherein the first information indicates at least one of:
a second resource;
performing at least one of the LBT detection or the resource transmission; or
not performing at least one of the LBT detection or the resource transmission,
wherein the processor is configured to: in response to a target value meeting a first preset condition, determine, according to the first information, to perform at least one of the LBT detection or the resource transmission for the first resource, wherein the target value is a random value, or the target value is a value corresponding to the first resource, wherein the first preset condition corresponds to the first resource; the first preset condition comprises at least one preset condition; and preset conditions corresponding to different resource objects are same or different, and wherein the preset condition is determined according to at least one of: an indication from a network device, a default of a terminal device, or a condition predefined in a protocol.

16. The terminal device of claim 10, wherein
the terminal device operates on an unlicensed spectrum, or the terminal device operates on a licensed spectrum.

17. The terminal device of claim 10, wherein
the processor is further configured to perform the LBT detection according to second information, wherein the second information indicates at least one of: a resource location, a Fixed Frame Period (FFP), a starting time of the FFP, an LBT period of Frame Based Equipment (FBE), or an LBT starting time of the FBE, and wherein the method further comprises: a receiver, configured to receive the second information sent by a network device before the processor performs the LBT detection of the terminal device according to the second information.

18. The terminal device of claim 10, wherein second information and the first information are determined according to at least one of:
an indication from a network device, or information predefined in a protocol.

19. The method of claim 6, wherein the first resource comprises one of:
any resource, a part of resources, all of the resources, a specific resource, or a resource for a specific object.

20. The method of claim 19, wherein the resource for the specific object comprises at least one of:
a resource for a specific logical channel, a resource for a specific service, a resource for a specific priority, a resource for a specific identifier, a resource for a specific terminal device, or a resource for a specific type.

21. The method of claim 20, wherein the resource for the specific priority comprises at least one of: a resource for a specific resource priority; a resource for a specific-priority service;
or a resource corresponding to a specific-priority service when the specific-priority service exists, or a resource corresponding to a logical channel when the logical channel has data to be transmitted;

or, wherein the specific terminal device comprises at least one of: a terminal device with a specific priority, a terminal device in a specific group, a terminal device with a specific identifier, or a terminal device with a specific capability;

or, wherein the resource for the specific type comprises at least one of: a Physical Random Access Channel (PRACH) resource, a Dynamic Grant (DG) resource, a Configured Grant (CG) resource, a Physical Uplink Shared Channel (PUSCH) resource, or a Physical Uplink Control Channel (PUCCH) resource.

22. The method of claim 6, further comprising: before determining, according to the first information, not to perform at least one of the LBT detection or the resource transmission, or to perform at least one of the LBT detection or the resource transmission for the first resource,
receiving the first information indicated by a network device.

23. The terminal device of claim 15, wherein the first resource comprises one of:
any resource, a part of resources, all of the resources, a specific resource, or a resource for a specific object.

24. The terminal device of claim 15, wherein
the terminal device operates on an unlicensed spectrum, or the terminal device operates on a licensed spectrum.

25. The terminal device of claim 15, wherein
the processor is further configured to perform the LBT detection according to second information, wherein the second information indicates at least one of: a resource location, a Fixed Frame Period (FFP), a starting time of the FFP, an LBT period of Frame Based Equipment (FBE), or an LBT starting time of the FBE, and wherein the method further comprises: a receiver, configured to receive the second information sent by a network device before the processor performs the LBT detection of the terminal device according to the second information.

26. The terminal device of claim 15, wherein second information and the first information are determined according to at least one of:
an indication from a network device, or information predefined in a protocol.

* * * * *